Figure 1:
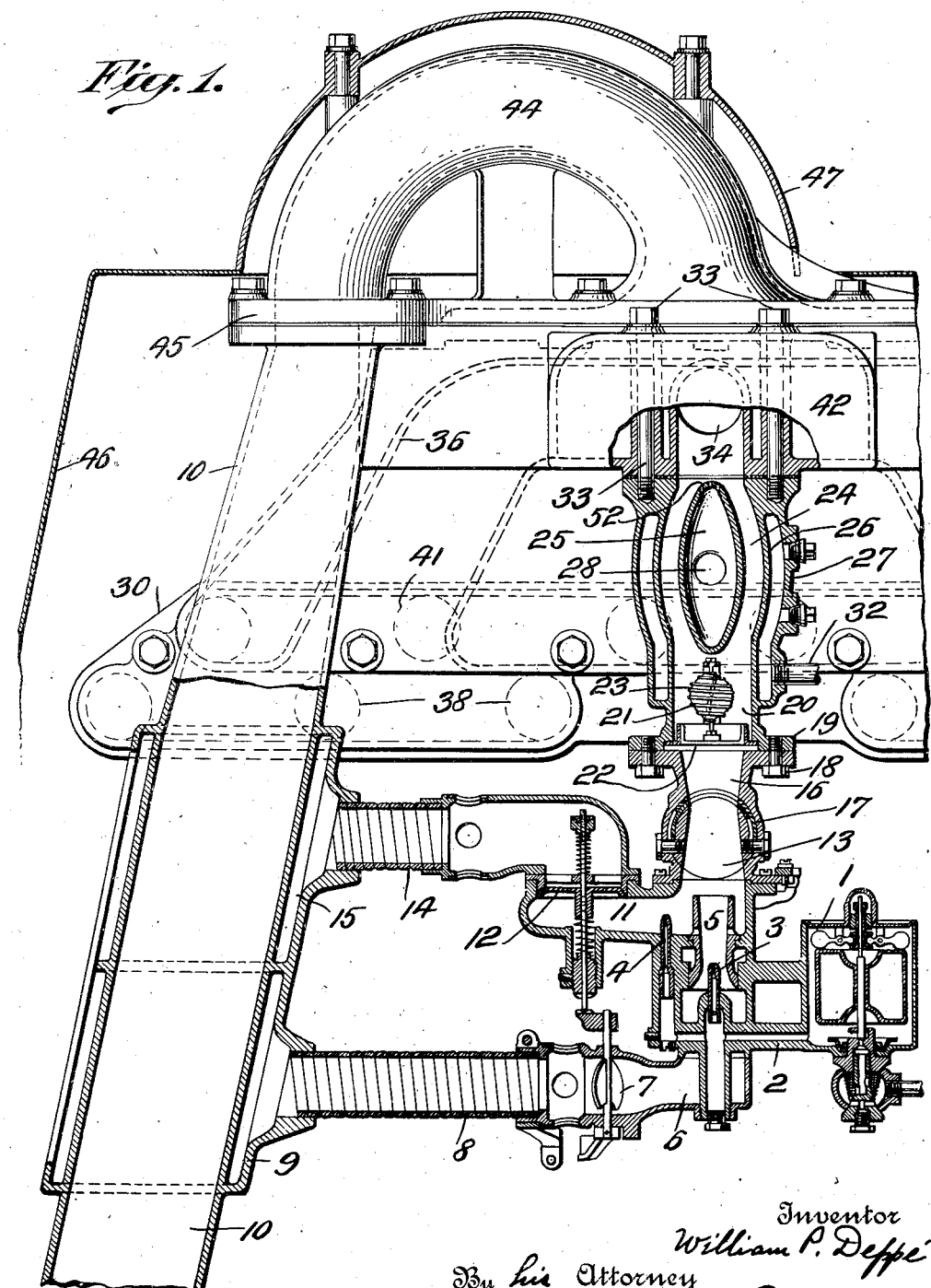

July 21, 1931.   W. P. DEPPÉ   1,815,432
INTERNAL COMBUSTION ENGINE
Filed Dec. 27, 1920   2 Sheets-Sheet 2
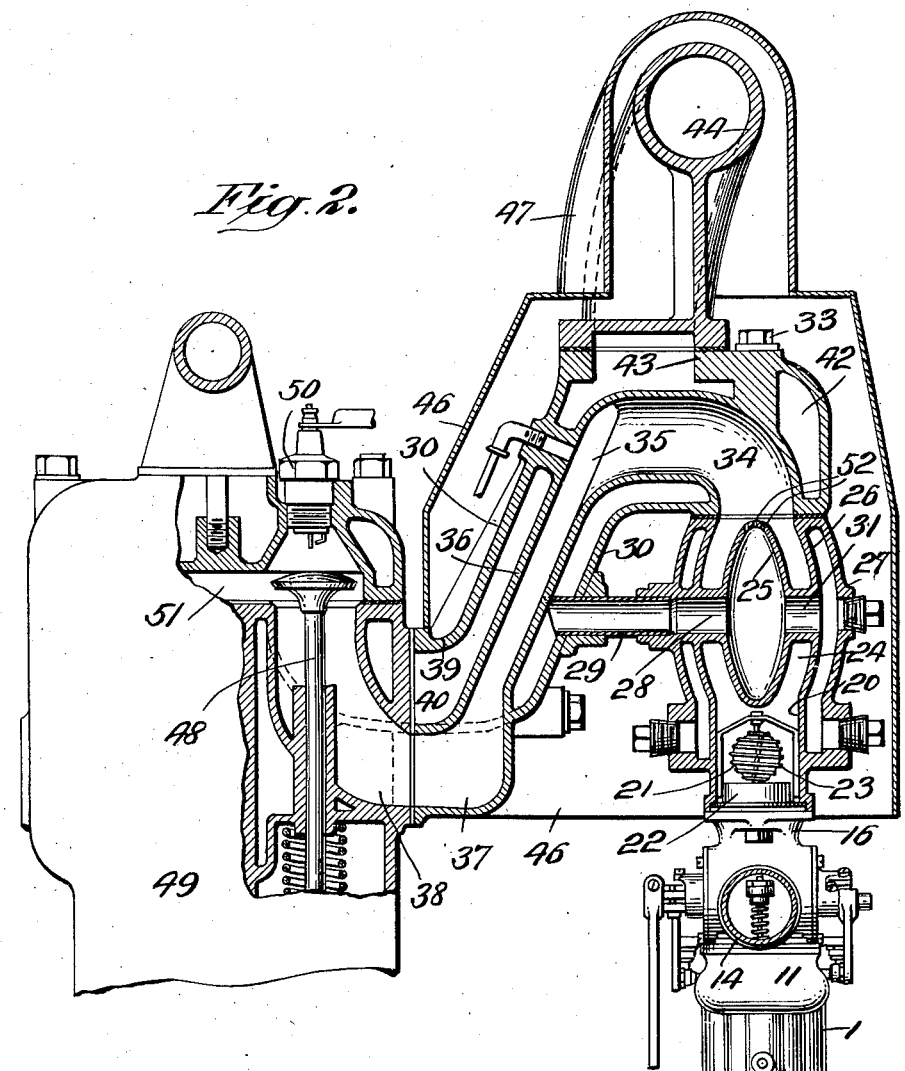
Fig. 2.
Fig. 3.
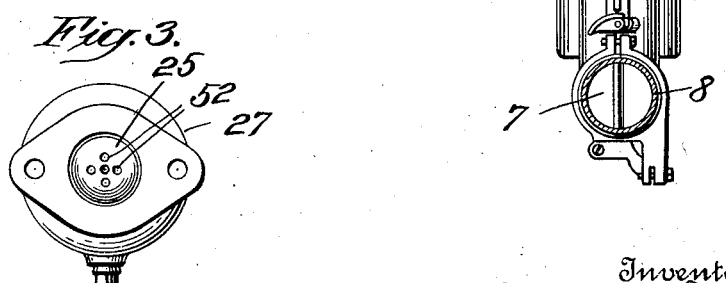
Inventor
William P. Deppé
By his Attorney
M. H. Lockwood Patented July 21, 1931

1,815,432

UNITED STATES PATENT OFFICE

WILLIAM P. DEPPÉ, OF BRIGHTWATERS, NEW YORK

INTERNAL COMBUSTION ENGINE

Application filed December 27, 1920. Serial No. 433,179.

My improvement relates more particularly to the operation of an internal combustion engine, with a superheated homogeneous dry gaseous mixture of liquid combustibles and air, diluted with and ionized by hot products of combustion in the generating means, which products are preferably introduced into the completely vaporized mixture between the proportioning device and the inlets to the combustion chambers, the mixture being explosive in the combustion chambers of the engine under the pressures and temperatures obtaining during operation.

The principal object of my present invention is to provide a new process of producing and conditioning a fuel charge for utilization in internal combustion engines, whereby orderly sequences are developed in the fuel mixtures before ignition for power, and which are secured automatically at all speeds and throttle openings, giving cycles of reactions after ignition, which permit higher engine speeds, higher temperatures, higher compression, controlled combustion and greater sustained torque and thermal efficiency than heretofore possible in so called wet mixture injection fuel practices.

Because of the extremely short time limits in high speed engine operation, it is impossible to vaporize liquid combustibles of hybrid nature, such as the fuel oils of commerce, in the proper air ratios without the application of heat in controlled amounts in successive stages to progressively raise the temperature of the mixture, while subjecting it to turbulence and integration of the lighter vapors with the heavier cuts of the combustibles until all are vaporized, the mixture being rendered homogeneous and raised above the partial pressure boiling or vaporizing points in the generating means, in the air ratios employed. During this treatment of the mixture it is necessary to avoid thermal shock, cracking and the spheroidal state of the liquid combustibles and thereafter superheating them, which can be done only after complete vaporization. Such a mixture, in itself, is a highly efficient operating medium for the engine but for higher compression pressures, with sustained torque and after ignition pressures, my present improvement contemplates ionizing and diluting this mixture by the introduction thereinto of controlled amounts of hot products of combustion at a temperature that will not crack the combustibles.

Boiling points of liquids vary under varying conditions and hence the boiling or vaporization points of combustibles or liquid fuels in air mixtures as used in operating engines according to my method, must be considered as those prevailing under the conditions of operation. It is well known that during the operation of the engine a partial vacuum exists in the intake manifold and this in itself is a factor in lowering the boiling point of the liquid fuel constituents. Furthermore, under Dalton's law on partial pressures, the vaporizing or boiling point of the various constituents of mixed liquids in the presence of their vapors and air gases varies according to the partial pressures of the vapors of the various constituents. The air is a mixture of gases and the liquid fuels ordinarily used as combustibles in an internal combustion engine, are of a hybrid nature, and comprise a plurality of constituents having a variety of vaporizing or boiling points and hence when the liquid fuels in an air mixture are completely vaporized in the conduits of the intake manifold, the boiling or vaporization points that must be taken into consideration are those resulting from the partial pressures of the vapors and gases present, and such boiling points are referred to as partial pressure boiling points.

The partial pressure boiling points must not be confused with so-called end points, which are determined by the Engler flask distillation method, which is a fractional distillation or boiling off of the liquid under atmospheric pressure, the various constituents being removed in succession until the highest end point is reached, after which there is usually a residue remaining in the flask. In complete vaporization, according to my method, under the partial pressure conditions existing in the intake manifold, where all the constituents are kept in contact in the mixture, equilibrium conditions prevail, and gasoline such as ordinarily obtained at service stations, may be completely vaporized at approximately 120° F. with a 15 to 1 mixture ratio. Such gasoline according to the Engler test has approximately an end point of 410° F., with a residue of 3 or 4% remaining in the flask. These lower or partial pressure boiling points with the resultant complete vaporization of the fuel constituents under equilibrium conditions in my method, are the result of stage or progressive heating of the mixture, with suitable agitation therein, giving complete vaporization without residue, and the mixture then may be readily superheated at temperatures below the cracking point or the spheroidal state of the fuel constituents.

Many attempts have been made to utilize products of combustion but the same were first cooled or when used while still hot, were injected into the fuel mixture while the same was cold, and the combustibles largely in the condition of liquid in more or less mass, with no provision for maintaining the temperatures of the mixtures after injecting the products of combustion. Thus the heat of the exhaust gases was dissipated in furnishing a small part of the latent heat of vaporization for the liquid fuels, also all the electrical energy carried by the hot products of combustion, fresh from the presence of combustion processes, likewise is dissipated, without having the ionizing effect on the fuel charge, that occurs when the live hot products of combustion are injected into the hot fuel mixture and the mass maintained above the temperature of vaporization of the liquid combustibles in the mixture, as is done by my method.

Diffusion is very swift in hot gases as compared to cold gases, and homogeneity is lacking where the fuel charge is composed, in part, of liquid combustibles below the boiling or vaporization points under the pressure, temperature, time limits and combustible-to-air ratio existing in the average intake passage in wet mixture practice. In this new method of treating the fuel charges, it not only raises the temperature of the mixture in the mass, but has the peculiar effect of developing properties in the mixture which allows higher temperatures and higher compressions without developing preignition in the generating means or preignition or auto-ignition under compression, or the development of socalled detonating forces, that is, excessive flame speeds, after ignition. Likewise, this sort of mixture is capable of being further ionized by the hot products of combustion remaining in the combustion chambers, where not ordinarily driven out, but no such effort is possible in wet mixture practice.

My present invention is an improvement and further step in the development of better operating conditions of internal combustion engines as outlined in my issued Patents, No. 1,335,665 of March 30, 1920, and No. 1,360,098 of November 23, 1920. As referred to in these patents and in carrying out my improved method, it is essential to avoid cracking the liquid combustibles, either as liquids or vapors in the mixture, for if cracking occurs, the mixture cannot become the homogeneous efficient mixture produced by my method. It is well known that liquid combustibles crack at a lower temperature than the vapors thereof, therefore, the temperatures maintained for the conduits and the injected products of combustion must be such as will not crack the liquid combustibles when sprayed into the air or on coming into contact with the walls of the conduit, nor crack the vaporized combustibles.

Obviously complete vaporization cannot take place in time to facilitate the formation of a completely homogeneous mixture if the spheroidal state of the liquid combustibles occurs and hence this gives another limiting factor as to permissible temperatures in the mixture and the walls of the conduit, and my method contemplates controlling the temperatures to prevent both cracking and the spheroidal state of the liquid combustibles in air mixtures under the partial pressure conditions obtaining in the generating means during operation of the engine.

In this improved method the amount of products of combustion injected in the fuel mixture may be automatically controlled by the speed of engine, which regulates the pressures and temperatures developed, while the amount of the products of combustion remaining in the combustion spaces may or may not be the same for all speeds, and throttle openings, where complete scavenging is not provided for. In this method also it is possible to increase the pressure of the products of combustion remaining in the combustion chambers, or maintain desired pressures in the exhaust passages feeding into the intake passages, where such injections are made from exhaust gas passages by restricting the final outlets.

It is obvious that live products of combustion from other sources than the engine may be utilized in whole or in part in this method for ionizing and heating the fuel charges above the boiling or vaporizing temperatures as they exist under the operating conditions in any intake passage system on any particular engine. When, however, the live products of combustion from the engine are utilized for injections into the hot homogeneous mixtures, these will be under considerable pressure over any pressure existing in the intake fuel passages, and by proper arrangement of the injection nozzles or openings, preferably in the direction of the flow of the fuel mixtures, a super-charging effect is produced, aside from the added volume of products of combustion gases entering the fuel mixtures. Furthermore, a larger amount of controlled injections of live products of combustion may be sent into fuel passages in this manner than possible by any method heretofore disclosed, and sufficient to compensate for the smaller amount of live products of combustion left in combustion chambers when one cuts down the clearance space to secure the higher compression pressures commercially possible in this new method of treating and utilizing the fuels.

The dissociation of the products of combustion is a desirable feature in this improved method, for it provides a means for utilizing the excess temperature and heat developed during compression, and combustion, because this absorbed heat is again delivered for useful work later in the working stroke. This sharply increases the thermal efficiency of the engine through the higher engine speeds possible, the higher compressions, greater power developed, and much longer sustained torque, due to the orderly sequences in preparing the charges, and the cycles of reactions developing in my new mixtures, which are quite different in fact and effects than those produced in heterogeneous wet mixture fuel charges.

It is particularly noted that I am dealing with a dry gaseous mixture in which the proportions of combustibles and air are such as to form a lean mixture, which is further diluted by the addition thereto of live products of combustion, and the temperatures of the mixture is progressively raised to give the mixture the properties of homogeneous gas so that when the mixture enters the cylinders it may be subjected to relatively high pressures as compared with wet mixture practices, without preignition and with the elimination of socalled detonations. It is found also that the mixture formed under the conditions of my improvement is not subject to auto-ignition under high pressures, but on the contrary requires a specially coordinated ignition apparatus to ignite it under the conditions of high temperatures and pressure prevailing in the cylinders of the engine and at the various speeds of operation of the automobile.

In order to get the best effects of the exhaust gases, it is preferable that the diluent live products of combustion should be introduced into the mixture as quickly as possible after leaving the combustion chamber, and to obtain the full effect of the ionizing action on the mixture, the products of combustion should be introduced above the carburetor and after the mixture is made approximately dry.

It is obvious, however, that various forms of devices and apparatus may be devised for various types of engines and various grades and mixtures of combustibles, and I do not wish to be limited to any particular means or types of devices in this new process of producing the fuel charges specified and operating engines therewith.

In carrying out my present improvement, I have shown one form of apparatus for carrying out my invention, the same being provided with means for injecting the exhaust gases into the mixture on its way to the engine.

Fig. 1 represents a side elevation of my apparatus as adapted for a six cylinder engine, the lower part of the apparatus being shown in section; Fig. 2 represents a transverse view with the upper part of the apparatus in section and part of the engine cylinder broken away; and Fig. 3 represents a top view of the heater and mixer showing the holes for admitting exhaust gases to the mixture.

Referring to the drawings, 1 represents the float tank of the carburetor, which is connected by the conduit 2 with the primary nozzle 3 and the secondary nozzle 4 in the usual manner. The primary nozzle projects into the Venturi-tube 5 through which highly heated air is passed and adapted to pick up fuel from the primary nozzle. The lower part of the air inlet chamber 6 of the carburetor is provided with a choke valve 7 and is connected by a tube 8 with a heating jacket 9, surrounding a portion of the exhaust pipe 10, as will be seen in Fig. 1 of the drawings. The secondary nozzle 4 projects into the auxiliary air chamber 11, which is provided with a valve 12, under spring adjustment to automatically open when the vacuum pressure reaches a predetermined amount, to admit heated air which will pick up fuel from the secondary nozzle 4, the two streams of mixture being adapted to combine in the chamber 13 above the Venturi-tube. The auxiliary air is drawn through a conduit 14, which is connected to a suitable jacket 15, similar to jacket 9 surrounding the exhaust pipe 10 as indicated in Fig. 1. The nozzles 3 and 4 in my improved apparatus are preferably provided with smaller holes than ordinarily used in wet mixture apparatus.

The mixture in passing through the chamber 13 is adapted to pass through a Venturi-like passage 16, which is provided with centrally opening throttle valve leaves 17 adapted to at all times keep the mixture column central of the conduit. The upper end of the throttle valve section is connected by bolts 18 with the lower end 19 of a heater and mixer section which comprises a chamber 20, in which a rotary mixer 21 is mounted in a suitable bracket 22, as will be seen in Figs. 1 and 2 of the drawings. The mixture is adapted to pass upward through the chamber 20 and rapidly rotate the mixer 21 by means of suitable vanes 23, the effect being to thoroughly atomize the mixture and render it homogeneous, the chamber 20 being heated from the exhaust gases. The chamber 20 opens into an annular conduit 24 formed between an inner bulb 25 and an enclosing bulb 26, the inner bulb being spaced from the enclosing bulb to form a uniform annular sheeting section. The enclosing bulb 26 is surrounded by a jacket 27, and the inner bulb 25 is connected by means of the tubular channel 28, (see Fig. 2) and a pipe 29 with the exhaust passage or chamber 30, so that live exhaust gases may be conducted directly from the exhaust passage of the engine to the interior of the bulb 25. The exhaust gases, after passing into the bulb 25, are, by means of the small tube 31, permitted to enter the jacket 27 and heat the outside of the enclosing bulb 26. The jacket 27, it will be seen, extends downward to cover the chamber 20 of the mixer and the exhaust gases after passing through the jacket 27, are led out through a suitable pipe 32, as indicated in Fig. 1 of the drawings. From this construction, it will be seen that the mixture is spread out or sheeted in the annular portion of the heater and mixer and heated on both sides. This construction facilitates raising the temperature of the mixture rapidly and, as utilized in this my new method, is similar to that shown in my Patent, No. 1,189,797, July 4, 1916.

The upper end of the heater and mixer is secured by bolts 32 to the intake manifold which comprises a curved tubular section 34, adapted to change the direction of flow of the mixture substantially 90°. The circular curved end 34 of the intake manifold at its inner end is connected at 35 with a pair of flattened, downwardly and angularly extending spreader arms 36, which at their lower ends are spread out in the form of chambers at 37 each to cover three of the intake openings 38 of the engine, substantially as indicated in Figs. 1 and 2 of the drawings. The thinly flattened intake manifold spreader arms 36 are adapted to thinly sheet the mixture passing therethrough and the mixture is adapted to be heated and its temperature raised sufficiently high to give the properties of a homogeneous gas by surrounding the intake manifold with the highly heated exhaust gases.

For this purpose, the exhaust manifold 30 is preferably formed as a flattened chamber with its walls 39, parallel with the flattened walls of the spreader arms 36. The exhaust manifold is provided with a narrow opening at 40 extending transversely of the engine cylinders and adapted to cover the exhaust ports 41, indicated in dotted lines in Fig. 1 of the drawings. The shape of the exhaust ports and their connections with the exhaust manifold chamber or passages are also indicated by dotted lines in Fig. 2 of the drawings. The upper end of the exhaust chamber 30 is provided with an outwardly extending portion 42 substantially uniformly spaced from the curved end 34 of the intake manifold, so that this may be heated by the exhaust gases. The chamber 42 has an opening at 43, communicating with one end of a semi-circular portion 44 of the exhaust pipe, the opposite end 45 thereof being connected with the downwardly extending portion of the exhaust pipe 10, which, as previously described, is surrounded by the air heating jackets 9 and 15, as shown in Fig. 1 of the drawings.

The manifold and heater and mixer as well as the upper portion 44 of the exhaust pipe are preferably enclosed by a jacket 46—47 to form a blanket of air or gases about the highly heated parts and thus assist in maintaining the correct temperature required in carrying out my improved operation of the engine.

The intake ports 38 and exhaust ports 41 are provided in the usual manner with valves 48 and each cylinder of the engine 49 is provided with spark plugs 50, for firing the mixture. In my improved engine, the clearance space at 51 between the piston and the cylinder head is preferably made proportionately less than in engines adapted for wet mixture method, thereby very considerably increasing the compression pressures for the mixture employed by my method. In this connection it is well also to state that in order to fire the lean mixtures produced by my improvement and compressed to such high pressures, it has been found necessary to use an ignition system giving a hotter spark than is required in wet mixture practice.

In my present improvement, I have preferably provided the upper end of the bulb 25 with a plurality of small holes at 52, (see Fig. 3), which permit the exhaust gases coming from the exhaust chamber or passage 30 through the tubes 28 and 29 to pass out into the mixture, after the latter passes through the annular sheeting portion 24 of the heater and mixer. The number and size of the holes 52 in the upper end of the bulb 25, as indicated in Figs. 1, 2 and 3 of the drawings may be varied to meet varying conditions as to the fuels used and the size of the engine as well as to control the amount of dilution required and the pressure and temperature of the mixture in its passage through the intake manifold.

In practice it has been found that with the introduction of exhaust gases, into the mixture, as herein described, much higher compression pressures may be used in the engine with lean mixtures, which, under the high pressure and temperature resulting therefrom, are adapted to be fired, thereby giving greater thermal efficiency and facilitating the operation of the engine at much higher speeds without over-heating and without any signs of preignition or detonation when low grade fuels are used.

It will be understood that the live exhaust gases may be introduced into the mixture at any desired point, but satisfactory results have been obtained by the introduction thereof, through small holes at the upper end of the bulb 25. This has the advantage of meeting the mixture after it has been rendered substantially homogeneous and thoroughly dried by the heater and mixer and further of creating a turbulence, such as to thoroughly mix the incoming exhaust gases with the mixture of combustibles and air and assist in heating the mixture.

I do not wish to be limited to any particular point at which to introduce the live exhaust gases into the mixture but preferably this may be done between the carburetor or proportioning device for metering the combustibles and air and the intakes of the engine, the exhaust gases being preferably introduced or projected into the mixture in the direction of flow of the mixture on its way to the engine. When the exhaust gases are introduced in this manner, it will be understood that the momentum of the exhaust gases will be added to the suction of the engine and will tend to increase the vacuum in the carburetor so as to super-charge the mixture. It will be obvious that the pressure of the exhaust gases may be varied by varying the outlet opening of the exhaust pipe and in this manner the super-charging effect may be predetermined, to any extent required.

Introducing the exhaust gases into the mixture column in this manner has the further advantage of being automatically controlled by the throttle opening and the speed of the engine. When the engine is operating at low speed with partially closed throttle, obviously the pressure in the exhaust pipe is less and the amount of exhaust gases forced into the mixture will be less than at high speeds or wide open throttle when the pressure in the exhaust pipe becomes greater. This automatic regulation may be supplemented if found necessary or desirable in particular types of engines in meeting certain operating conditions.

By this means, I am enabled to control the combustion in the engine so as to obtain greater fuel economy and thermal efficiency and eliminate so-called detonations or excessive flame speeds, such as occur in engines operated with low grade fuels according to the wet mixture method. Obviously, the proportions of combustibles and air as well as of the injected exhaust gases may be varied according to the fuels used and according to the particular design, speed and characteristics of the engine.

Furthermore, it will be understood that various modifications in the specific arrangement and adaptation of apparatus may be made for carrying out my improved method without departing from the spirit and scope of the invention.

I claim:—

1. The method of preparing exteriorly of the combustion chambers, a homogeneous dry gaseous mixture of combustibles and air and products of combustion for use in internal combustion engines, which comprises forming a mixture of liquid combustibles and air in proper ratios, diffusing the vapors and liquids by turbulence, while heating the mixture to completely vaporize the liquid combustibles and render the mixture substantially dry and homogeneous throughout, then adding hot products of combustion to the substantially dry homogeneous mixture without altering the homogeneity thereof, then heating the last named mixture so as to maintain it as a dry homogeneous gaseous mixture for delivery and use in the engine as such.

2. The method of preparing in a moving stream a homogeneous dry gaseous mixture of combustibles and air and products of combustion for use in internal combustion engines, which comprises mixing liquid combustibles and air in proper ratio, agitating and diffusing the mixture and simultaneously heating in successive stages at progressively increasing temperatures for completely vaporizing the combustibles and producing a homogeneous dry gaseous mixture, then adding hot products of combustion at a temperature such as will not alter the gaseous homogeneity of the mixture, then heating this mixture to maintain and deliver the same to the engine as a superheated homogeneous dry gaseous mixture, adapted for substantially instantaneous diffusion with the products of combustion in the cylinders and combustion chambers, and to insure a dry homogeneous mixture at the moment of ignition.

3. The method of preparing a homogeneous dry gaseous mixture of combustibles and air and products of combustion for use in internal combustion engines, which comprises mixing liquid combustibles and preheated air in proper ratio, diffusing the combustibles and air by agitation and turbulence and simultaneously heating the mixture for completely vaporizing the combustibles and forming a dry homogeneous mixture, then introducing into the dry homogeneous mixture controlled amounts of live exhaust gases adapted to maintain the temperature of the mixture without altering the gaseous homogeneity thereof and then transferring additional heat from the exhaust gases to the mixture for maintaining and delivering it to the engine as a superheated homogeneous dry gaseous mixture.

WILLIAM P. DEPPÉ.